United States Patent [19]

Unterforsthuber et al.

[11] Patent Number: 5,064,459
[45] Date of Patent: Nov. 12, 1991

[54] FILTER ARRANGEMENT FOR AIRBAG GAS GENERATORS

[75] Inventors: Karl Unterforsthuber, Oberhaching; Christian Geisreiter, München, both of Fed. Rep. of Germany

[73] Assignee: Bayern-Chemie Gesellschaft fur flugchemische Antriebe mbH GmbH, Fed. Rep. of Germany

[21] Appl. No.: 541,954

[22] Filed: Jun. 22, 1990

[30] Foreign Application Priority Data

Aug. 11, 1989 [DE] Fed. Rep. of Germany ....... 8909626

[51] Int. Cl.[5] .............................................. B01D 39/12
[52] U.S. Cl. ........................................ 55/512; 55/526; 55/527; 55/DIG. 42; 280/736
[58] Field of Search ..................... 55/512, 525–527, 55/DIG. 42, DIG. 43

[56] References Cited

U.S. PATENT DOCUMENTS

| 2,167,323 | 7/1939 | Hegan | 55/527 |
|---|---|---|---|
| 3,075,334 | 1/1963 | Nutting | 55/527 X |
| 3,087,233 | 4/1963 | Turnbull | 55/525 X |
| 3,458,338 | 7/1969 | Adams et al. | 55/527 X |
| 3,776,701 | 12/1973 | Hunter | 55/526 X |
| 3,780,872 | 12/1973 | Pall | 55/525 X |
| 3,934,984 | 1/1976 | Marlow et al. | 55/512 X |
| 4,158,449 | 6/1979 | Sun et al. | 55/526 X |
| 4,261,718 | 4/1981 | Garner | 55/526 X |
| 4,322,385 | 3/1982 | Goetz | 55/527 X |
| 4,329,844 | 5/1982 | Shadman et al. | 55/526 X |

FOREIGN PATENT DOCUMENTS

| 1140058 | 1/1983 | Canada | 55/526 |
|---|---|---|---|
| 52-048175 | 4/1977 | Japan | 55/526 |
| 1500157 | 2/1978 | United Kingdom . | |

*Primary Examiner*—Robert Spitzer
*Attorney, Agent, or Firm*—Evenson, Wands, Edwards, Lenahan & McKeown

[57] ABSTRACT

A filter arrangement for an airbag gas generator of the type utilizing gas-producing propellant charge to generate gas to inflate an airbag, and having a filter chamber exhibiting contoured interior surfaces. A gas permeable filter material with a large effective filter surface is disposed in the filter chamber in such a manner as to substantially completely fill up the filter chamber and to contact substantially all of its contoured interior surfaces. The filter material comprises a circular knitted wire knit, rolled up and pressed into a shape corresponding to the shape of the filter chamber.

5 Claims, 1 Drawing Sheet

FILTER ARRANGEMENT FOR AIRBAG GAS GENERATORS

BACKGROUND AND SUMMARY OF THE INVENTION

The invention relates to a filter for the gas flow of a gas generator equipped with a gas-producing propellant charge, the filter consisting of a woven netting, of a knitted netting or of a grid and being arranged inside a filter chamber.

On the basis of the German Published Unexamined Patent Application (DE-OS) 25 38 386, the use of woven wire nettings or knitted wire nettings has become known for filter inserts of airbag gas generators.

It is customary to use a winding of strips of woven wire netting for the filter which has an approximately rectangular cross-section. This winding is pressed and inserted into the filter chamber. However, since the cross-section of the filter chamber is not rectangular, but has radii in its contour, there are several resulting disadvantages: On the one hand, the available volume is not utilized and, on the other hand, difficulties occur during the mounting of the individual housing parts of the gas generator because of the high firmness of the wire winding. Finally, there is the important secondary effect that the gas jet coming out of the combustion chamber, in an unhindered manner, strikes the wall of the filter chamber consisting of aluminum and in the process removes material out of the wall and burns it. On the one hand, this influences the burn-up behavior of the gas generator and, on the other hand, holes may be burnt into the exterior wall through which the gas jet emerges.

It is an object of the invention to design a filter for an airbag gas generator, the housing of which may, for example, consist of aluminum and which avoids the above-mentioned disadvantages.

This object is achieved according to the invention in that the filter consists of a gas-permeable material with a large effective surface which completely fills up the filter chamber. A circular wire knit is preferably used for this purpose which, after being cut into lengths, is rolled up and is pressed into a shape corresponding to the filter chamber. An open-pored foam or a foam-type material is also suitable for this purpose, according to other contemplated embodiments of the invention.

The special advantages of the filter according to the invention are, on the one hand, that in the filter which fills up the filter chamber, the gas has a diffusely dispersed flow and therefore no longer acts in a punctiform manner on the outer wall. On the other hand, the efficiency of the filter will increase because empty spaces without any filter material are avoided inside the filter chamber. Finally, in addition to the advantage of avoiding incorrect mountings of housing parts which concerns the manufacturing process, there is also the economical advantage of a considerably lowerpriced manufacturability of the filter.

Other objects, advantages and novel features of the present invention will become apparent from the following detailed description of the invention when considered in conjunction with the accompanying drawings.

DETAILED DESCRIPTION OF THE DRAWINGS

Figure 1:
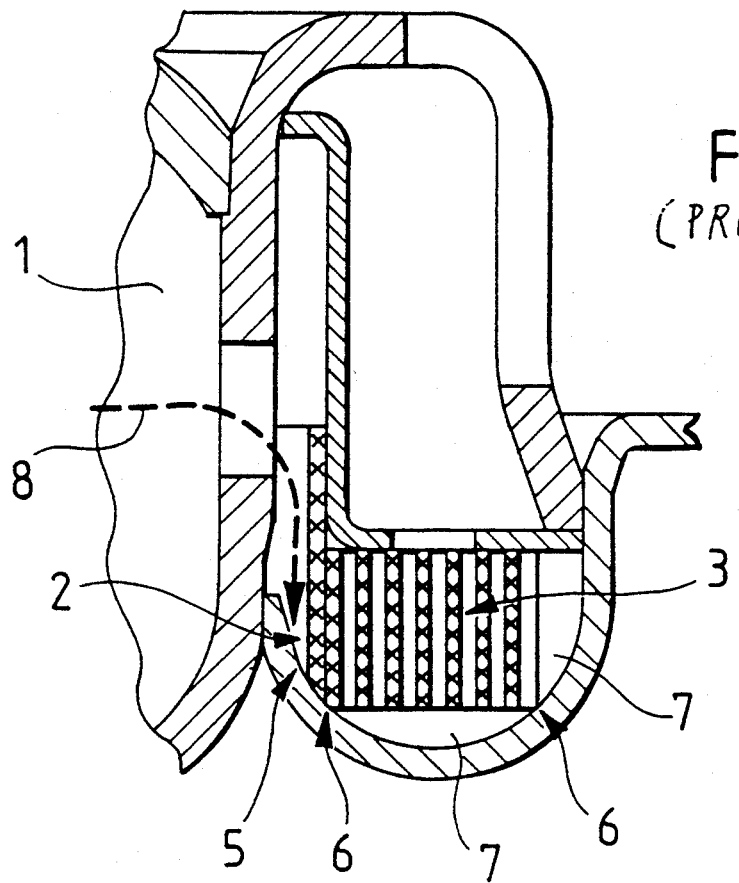
FIG. 1 is a sectional schematic view of a part of an airbag gas generator constructed according to the state of the art.

FIG. 1 is a schematically simplified sectional view of a part of a rotationally symmetrical gas generator of a conventional construction. The gas current 8 flows from the combustion chamber 1, in which the gas-producing propellant charge is disposed, into the filter chamber 2. In this filter chamber 2, a filter package 3 is arranged which is wound of several layers of strips of woven wire netting. This results in the approximately rectangular cross-section of the filter 3.

This cross-sectional shape results in several disadvantages: On the one hand, the gas jet 8 directly strikes the point of the filter chamber wall which is marked by reference number 5, whereby burnt-through holes may be created there as a result of the burning-away of the aluminum material of the wall. The gas flow can then escape through these burnt-through holes in an unfiltered manner. On the other hand, because of the fact that the filter winding 3 has a very compact construction and has pronounced edges at its circumference, problems occur during the mounting of the gas generator at the points of the filter chamber marked with reference number 6. Even if the inner and outer layers of the wire netting are only slightly too large, it will strike against the wall points 6 so that, when the housing is pressed together, the filter chamber wall will spring back and will thus prevent a gas-tight joining of the housing parts. In addition, as a result of the stiffness of the filter winding, a slipping may occur in the axial direction as well as a damaging of the filter chamber walls. In addition, unutilized empty spaces 7 remain in the filter chamber.

Finally, the disadvantage of the prior art FIG. 1 arrangement should be mentioned which is a result of the fabrication tolerance ranges of the wire diameter of the filter winding with respect to the heat absorption capacity. Since the heat absorption capacity, on the one hand, is proportional to the surface of the wire and, on the other hand, is a quadratic function of the weight of the filter winding, the deviation of the diameter has an effect in the third power. As a result, the gas outlet temperature varies considerably which has a disadvantageous effect on the inflating behavior of the airbag.

Figure 2:
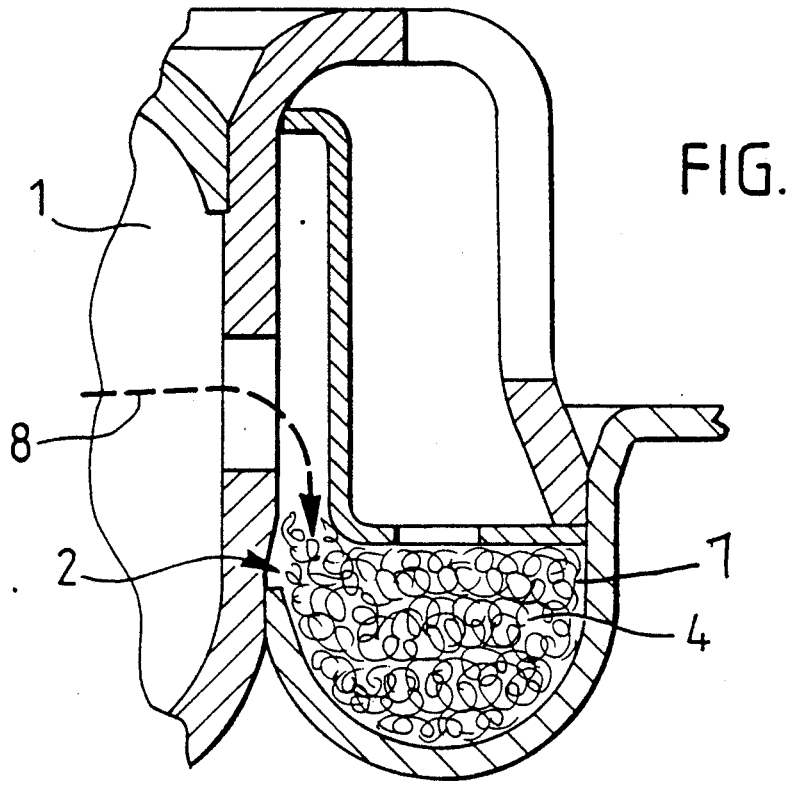
FIG. 2 is a view similar to FIG. 1, showing a filter arrangement according to a preferred embodiment of the innovation.

These mentioned disadvantages can be largely avoided by the use of the filter 4 according to the preferred embodiment of the invention illustrated in FIG. 2. An advantageous method of manufacturing a form-locking filter 4 according to the invention is the knitting of a hose-shaped wire netting on a continuous circular-knitting machine. After the cutting into lengths according to the desired weight, this wire netting is rolled up in the manner of a stocking and is subsequently pressed to the desired shape. Thus the measurements and the weight are given It follows that the heat absorption capacity of the filter will be a function only of the tolerance range of the wire diameter in a proportionally reverse manner. As a result, the variation of the output of the gas generator constructed by series production is considerably lower than in the case of a conventional filter winding 3. In addition, the manufacturing costs are considerably lower.

Finally, other embodiments of the invention are contemplated wherein, instead of a knitted wire netting, an open-pored foam-type material is used from the field of silicone compounds or of carbon compounds or the like, with characteristics which are similar to those of the wire knit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A gas generator apparatus for an airbag of the type utilizing gas-producing propellant charge for generating gas to inflate said airbag, said apparatus comprising a filter having:

a filter chamber exhibiting contoured interior surfaces, a gas permeable filter material with a large effective filter surface, said filter material being disposed in the filter chamber to substantially completely fill up the filter chamber so as to contact substantially all the contoured interior surfaces thereof, wherein said filter material comprises circular knitted wire knit rolled back on itself in a lengthwise direction thereof to form a torus and pressed into a solid shape corresponding to the shape of the filter chamber.

2. A filter arrangement according to claim 1, wherein said filter material consists of open-pored foam, which includes at least one of silicone compounds and carbon compounds.

3. A process for making a gas generator arrangement for an airbag of the type utilizing gas-producing propellent charge for generating gas to inflate an airbag, said process comprising the steps of:

forming a filter chamber exhibiting contoured interior surfaces, providing a circular knitted wire knit filter material;

rolling said circular knitted wire knit filter material back on itself and in a lengthwise direction thereof so as to form a torus;

pressing said circular knitted wire knit filter material into a shape corresponding to the shape of the filter chamber; and inserting said shaped filter material into said filter chamber to substantially completely fill up the filter chamber so as to contact substantially all of the contoured interior surfaces thereof.

4. A process of making a filter arrangement according to claim 3, wherein said filter material comprises circular knitted wire knit rolled up and pressed into a shape corresponding to the shape of the filter chamber.

5. A process of making a filter arrangement according to claim 3, wherein said filter material consists of open-pored foam.

* * * * *